(12) United States Patent
Hosoe

(10) Patent No.: US 11,173,867 B2
(45) Date of Patent: Nov. 16, 2021

(54) AIRBAG FOR A PASSENGER SEAT

(71) Applicant: TOYODA GOSEI CO., LTD., Kiyosu (JP)

(72) Inventor: Koji Hosoe, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 36 days.

(21) Appl. No.: 16/738,086

(22) Filed: Jan. 9, 2020

(65) Prior Publication Data

US 2020/0247350 A1 Aug. 6, 2020

(30) Foreign Application Priority Data

Feb. 5, 2019 (JP) .............................. JP2019-019159

(51) Int. Cl.
*B60R 21/2338* (2011.01)
*B60R 21/205* (2011.01)
*B60R 21/231* (2011.01)

(52) U.S. Cl.
CPC ........ *B60R 21/2338* (2013.01); *B60R 21/205* (2013.01); *B60R 2021/23161* (2013.01); *B60R 2021/23382* (2013.01)

(58) Field of Classification Search
CPC .............. B60R 21/2338; B60R 21/205; B60R 2021/23161; B60R 2021/23382; B60R 21/235; B60R 2021/23576; B60R 21/2346; B60R 21/239; B60R 2021/0004; B60R 2021/0032

See application file for complete search history.

(56) References Cited

U.S. PATENT DOCUMENTS

| | | | |
|---|---|---|---|
| 4,262,931 A | 4/1981 | Strasser et al. | |
| 2009/0250912 A1* | 10/2009 | Libby | B60R 21/233 280/730.1 |
| 2009/0295135 A1* | 12/2009 | Kumagai | B60R 21/2338 280/743.1 |
| 2011/0042922 A1* | 2/2011 | Miyata | B60R 21/237 280/730.1 |

(Continued)

FOREIGN PATENT DOCUMENTS

| | | | |
|---|---|---|---|
| JP | S56-67649 A | 6/1981 | |
| JP | H05-116583 A | 5/1993 | |

(Continued)

*Primary Examiner* — Drew J Brown
(74) *Attorney, Agent, or Firm* — Posz Law Group, PLC

(57) ABSTRACT

An airbag for a passenger seat adapted to be stored in a storage which is disposed in an instrument panel in front of a passenger seat is disclosed. The airbag includes a passenger-side wall which is disposed in a rear portion of the airbag as deployed for arresting a passenger, and a vehicle-side wall that extends from an outer circumferential edge of the passenger-side wall towards a front end of the airbag as deployed in a narrowing fashion for mounting on the storage by the front end. The vehicle-side wall includes a recessed area for circumventing an adjoining object disposed in the vehicle when deployed. The recessed area is composed of a tuck formed in a base member of the vehicle-side wall. The tuck is formed by jointing one or more pair of tuck jointing portions that are distant from one another in the base member as laid flat.

7 Claims, 11 Drawing Sheets

(56) References Cited

U.S. PATENT DOCUMENTS

| | | | |
|---|---|---|---|
| 2014/0097602 A1* | 4/2014 | Nam | B60R 21/2338 |
| | | | 280/743.1 |
| 2015/0258958 A1* | 9/2015 | Belwafa | B60R 21/239 |
| | | | 280/729 |
| 2015/0367802 A1* | 12/2015 | Fukawatase | B60R 21/205 |
| | | | 280/732 |
| 2016/0207490 A1* | 7/2016 | Yamada | B60R 21/235 |
| 2017/0217399 A1* | 8/2017 | Patel | B60R 21/01552 |
| 2017/0282841 A1 | 10/2017 | Hayashi et al. | |
| 2018/0015902 A1* | 1/2018 | Maenishi | B60R 21/2334 |
| 2019/0351862 A1* | 11/2019 | Aranzulla | B60R 21/231 |
| 2021/0061216 A1* | 3/2021 | Ito | B60R 21/216 |

FOREIGN PATENT DOCUMENTS

| | | |
|---|---|---|
| JP | 2017-65395 A | 4/2017 |
| JP | 2017-178066 A | 10/2017 |

* cited by examiner

AIRBAG FOR A PASSENGER SEAT

CROSS REFERENCE TO RELATED APPLICATIONS

The Present application claims priority from Japanese Patent Application No. 2019-019159 of Hosoe, filed on Feb. 5, 2019, the entire disclosure of which is incorporated herein by reference.

BACKGROUND

1. Technical Field

The present invention relates to an airbag for a passenger seat which is adapted to be stored in a storage disposed inside an instrument panel, and configured to deploy rearward, i.e. towards a passenger seat, when fed with an inflation gas.

2. Description of Related Art

JP 2017-065395 A discloses a known airbag for a passenger seat which is provided with a circumventing recess for avoiding engagement with a monitor of navigation system. More specifically, this airbag includes a passenger-side wall which is disposed at a rear portion of the airbag as deployed for arresting a passenger, and a vehicle-side wall which extends towards a front end of the airbag as deployed from an outer circumferential edge of the passenger-side wall in a narrowing fashion and is mounted on a storage by its front end portion. The circumventing recess is formed in the vehicle-side wall for avoiding engagement with the monitor as an adjoining object. The circumventing recess is formed by connecting an inboard-side region and an outboard-side region of the vehicle-side wall with a tether. A joint of the tether to the inboard-side region of the vehicle-side wall forms a bottom of the circumventing recess.

In the above airbag for a passenger seat, however, the tether is required to be prepared separate from the vehicle-side wall and joined to the inboard-side region and outboard-side region of the vehicle-side wall, which increases the number of parts of the airbag as well as man-hours for production of the airbag. It would be desirable to provide an airbag for a passenger seat with a circumventing recess having a simpler configuration.

SUMMARY

An exemplary embodiment of the invention relates to an airbag for a passenger seat adapted to be folded and stored in a storage which is disposed in an instrument panel in front of a passenger seat of a vehicle. The airbag includes a passenger-side wall that is disposed in a rear portion of the airbag as deployed for arresting a passenger, and a vehicle-side wall that extends from an outer circumferential edge of the passenger-side wall towards a front end portion of the airbag as deployed in a narrowing fashion, the vehicle-side wall being configured to be mounted on the storage by the front end portion. The airbag further includes, in the vehicle-side wall, a recessed area that is formed for circumventing an adjoining object disposed in the vehicle when deployed. The recessed area is composed of a tuck formed in a base member of the vehicle-side wall. The tuck is formed by jointing one or more pair of tuck jointing portions that are distant from one another in the base member as laid flat.

In the above airbag for a passenger seat, it is desired that the tuck is formed at a position distant from an outer circumferential edge of the base member of the vehicle-side wall.

In the above airbag for a passenger seat, it is also desired that a seam allowance of the tuck is disposed inside the airbag.

In the airbag for a passenger seat in accordance with the exemplary embodiment, it is further desired that the recessed area is disposed in a part of the vehicle-side wall to be deployed towards a center of width of the vehicle so as to circumvent an adjoining object disposed in a central area in a left and right direction of the instrument panel.

In the above instance, the airbag may be configured such that the passenger-side wall includes an outboard-side area that is deployable towards a side of the vehicle with respect to a center line which runs through a center of the storage generally along a front and rear direction, and an inboard-side area that is deployable towards the center of the vehicle width with respect to the center line and at a rear of the recessed area, and such that the inboard-side area is greater in area than the outboard-side area.

The airbag having the above configuration may be configured such that:

the passenger-side wall as deployed includes a passenger protection region for arresting the passenger sitting in the passenger seat and a center protection region for arresting a center passenger sitting in a center seat which is disposed between the passenger seat and a driver's seat; and the airbag as inflated further includes:

a main inflated portion that has the passenger protection region at a rear end thereof;

a protruding inflated portion that has the center protection region at a rear end thereof and is disposed at the rear of the recessed area; and a regulating tether that is joined to a boundary between the passenger protection region and the center protection region by a rear end thereof and joined to a bottom of the recessed area by a front end thereof, the bottom of the recessed area being disposed proximate to the main inflated portion, in order to shape the center protection region and the passenger protection region together into a generally flat plane at airbag deployment.

In the instance where the airbag as inflated includes the main inflated portion that has the passenger protection region at the rear end and the protruding inflated portion that has the center protection region at the rear end and is disposed at the rear of the recessed area, instead of the regulating tether, the airbag may include a bag-edge tether that connects a side edge of the passenger-side wall on the part of the center protection region and a front end portion of the airbag in order to prevent the airbag from oscillating in the vehicle-width direction at airbag deployment.

The above airbag may include both of the regulating tether and the bag-edge tether. In that instance, the regulating tether may be provided with a through opening that allows passage of the bag-edge tether.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Especially, in the following detailed description, for purposes of explanation, numerous specific details are set forth in order to provide a thorough understanding of the disclosed embodiments. It will be apparent, however, that one or more embodiments may be practiced without these specific details.

Referring to FIGS. 1 to 4, a passenger airbag 13 in accordance with an exemplary embodiment is used in an airbag device M for a passenger seat. The airbag device M is adapted to be mounted on a vehicle V which includes a driver's seat DS, a passenger seat PS and a center seat CS disposed between the driver's seat DS and passenger seat PS for use by a center passenger P2. In the vehicle V, the driver's seat DS is located on the right side, and the airbag device M is disposed in front of the passenger seat PS. The airbag device M is a top-mount airbag device which is mounted inside a top plane 1a of the instrument panel or dashboard 1. The dashboard 1 includes a center panel 2 which is disposed in a vicinity of the center in a vehicle-width direction of the dashboard 1 and partially protrudes rearward. Unless otherwise specified, front-rear, up-down, and left-right directions in the following description are intended to refer to front-rear, up-down, and left-right directions of the vehicle V.

Figure 2:
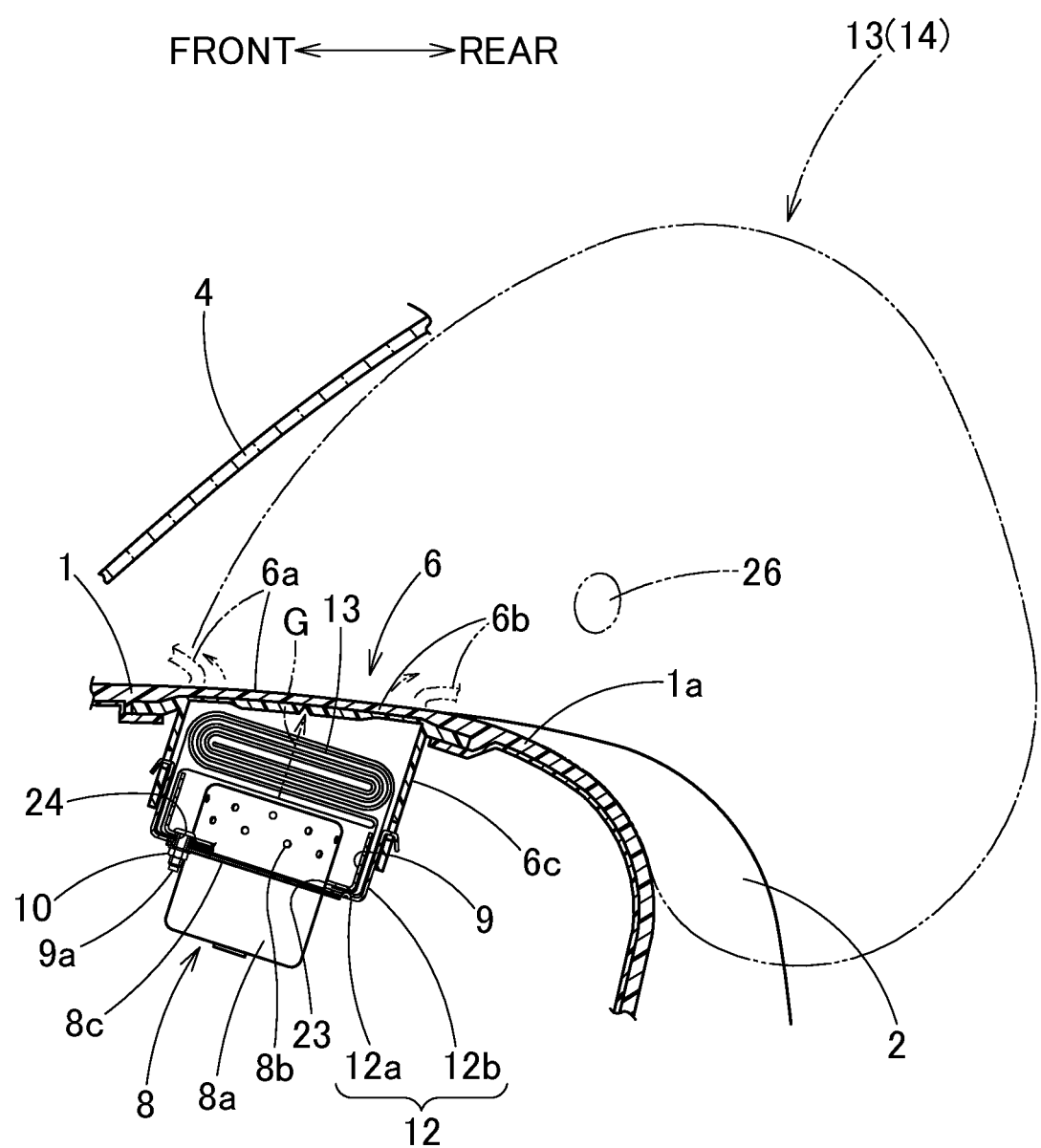
FIG. 2 is a schematic vertical sectional view of the airbag device for a passenger seat of FIG. 1 as mounted on the vehicle.

As shown in FIG. 2, the airbag device M includes an airbag 13, which is folded up, an inflator 8 for supplying the airbag 13 with an inflation gas G, a case (i.e., a storage) 12 for housing and holding the airbag 13 and inflator 8, a retainer 9 used for mounting the airbag 13 and inflator 8 on the case 12, and an airbag cover 6 for covering the airbag 13.

The airbag cover 6 is integral with the dashboard 1 made from synthetic resin, and includes two doors, i.e. front and rear doors 6a and 6b which are designed to open when pushed by the airbag 13 upon airbag deployment. The airbag cover 6 further includes, around the doors 6a and 6b, a joint wall 6c which is coupled to the case 12.

As shown in FIG. 2, the inflator 8 includes a body portion 8a which has a generally pot-like shape and is provided with numerous gas discharge ports 8b, and a flange 8c for attachment to the case 12. The gas discharge ports 8b are arranged radially on the body portion 8a. The inflator 8 of the illustrated embodiment is designed to be actuated in the event of a frontal collision of the vehicle V.

The case (i.e. storage) 12 is made of sheet metal into a generally rectangular parallelepiped, and has a generally rectangular opening on top. As shown in FIG. 2, the case 12 includes a bottom wall 12a of a generally rectangular plate shape and a circumferential wall 12b extending upward from the outer edge of the bottom wall 12a. The inflator 8 is set in the case 12 from the lower side of the bottom wall 12a. The circumferential wall 12b is coupled with and retains the joint wall 6c of the airbag cover 6. In the illustrated embodiment, the airbag 13 and the inflator 8 are secured to the case 12 with the aid of the retainer 9, which is located inside the airbag 13. Bolts 9a of the retainer 9 are put through a peripheral portion of a later-described gas inlet port 23 (FIG. 7) of the airbag 13, the bottom wall 12a of the case 12 and the flange 8c of the inflator 8, then fastened with nuts 10. Thus the airbag 13 and the inflator 8 are secured to the bottom wall 12a of the case 12. The bottom wall 12a of the case 12 is also provided with a bracket (not shown) to be jointed to the vehicle body structure.

Figure 7:
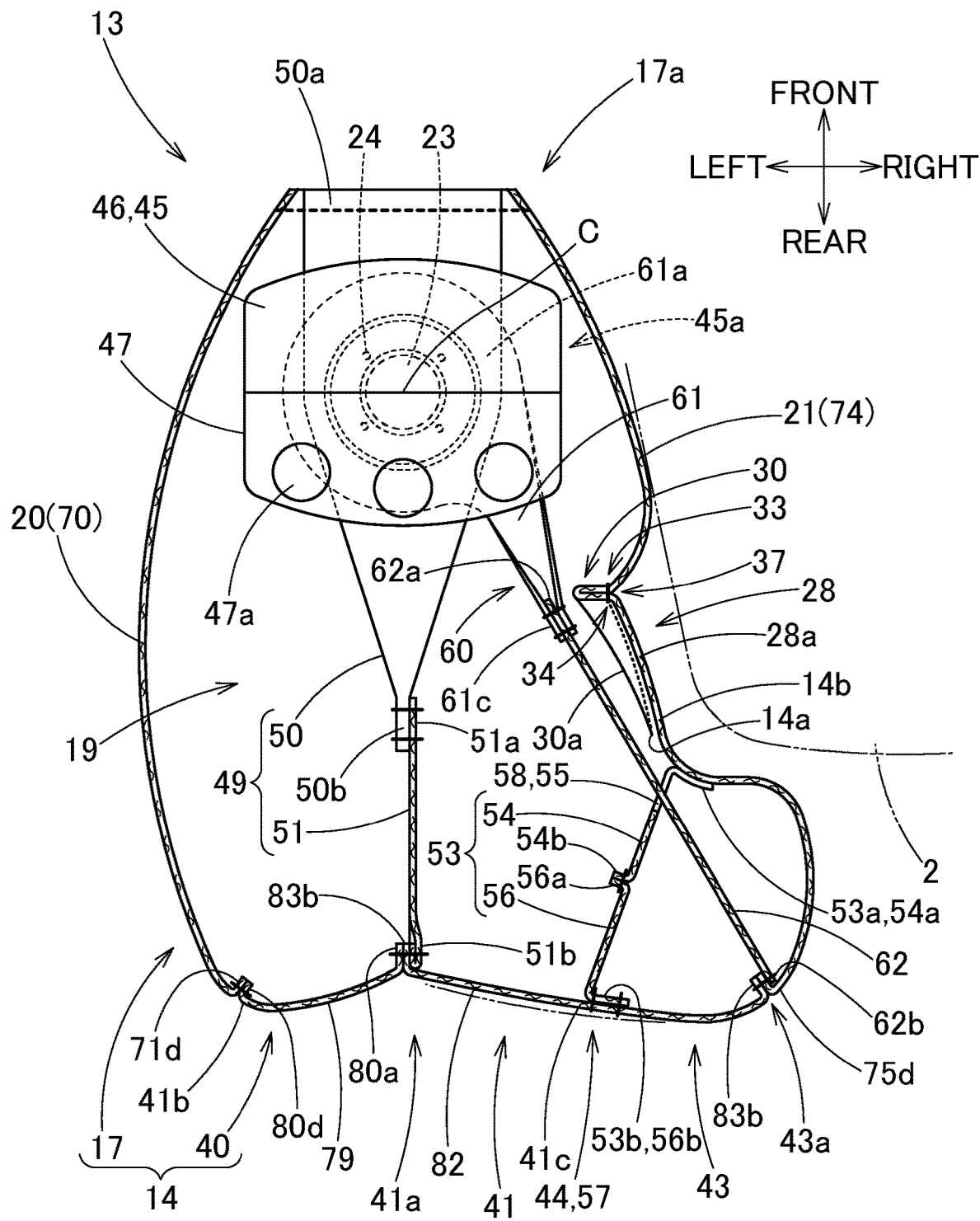
FIG. 7 is a schematic horizontal sectional view of the airbag of the exemplary embodiment as inflated by itself.
Figure 8:
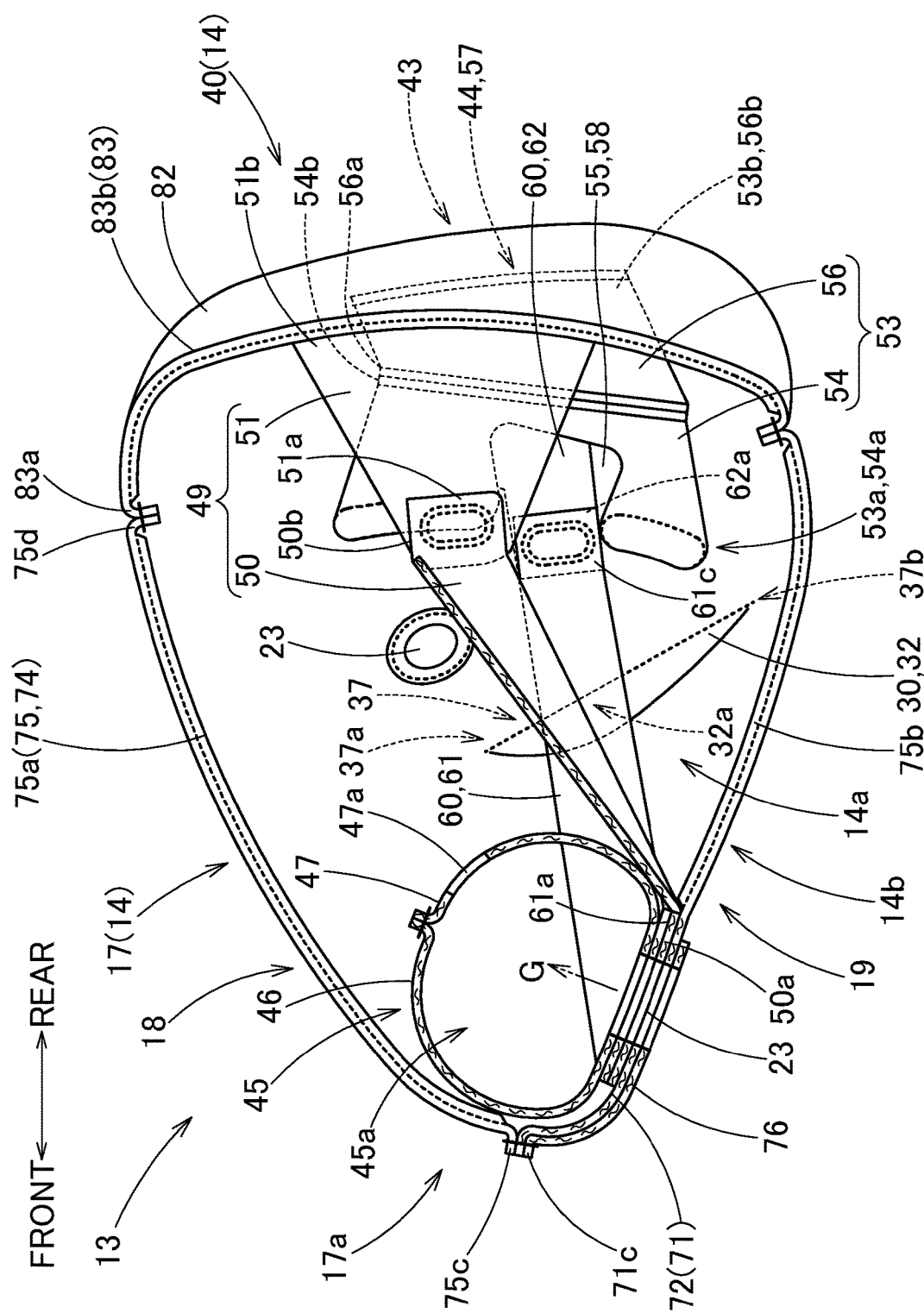
FIG. 8 is a schematic vertical sectional view of the airbag of the exemplary embodiment as inflated by itself.

Referring to FIGS. 7 and 8, the airbag 13 includes a bag body 14 which forms an outer shell of the airbag as inflated, a redirecting cloth 45 which redirects an inflation gas as has flown into the bag body 14, and a plurality of tethers 49, 53 and 60 which are disposed inside the bag body 14 for controlling the shape of the bag body 14 as inflated.

Figure 1:
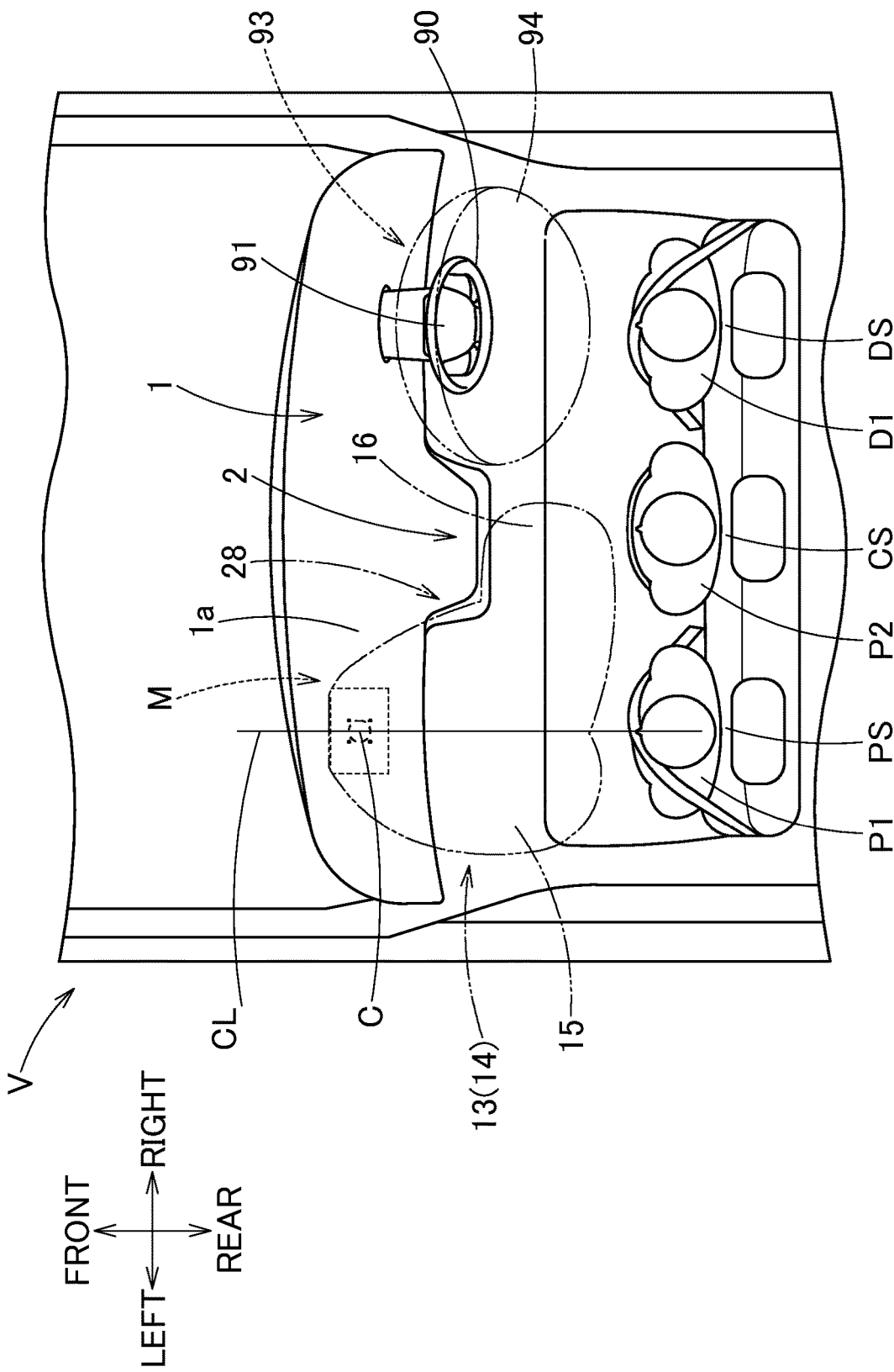
FIG. 1 is a schematic plan view of an airbag device for a passenger seat as mounted on a vehicle, the airbag device using an airbag for a passenger seat in accordance with an exemplary embodiment.
Figure 3:
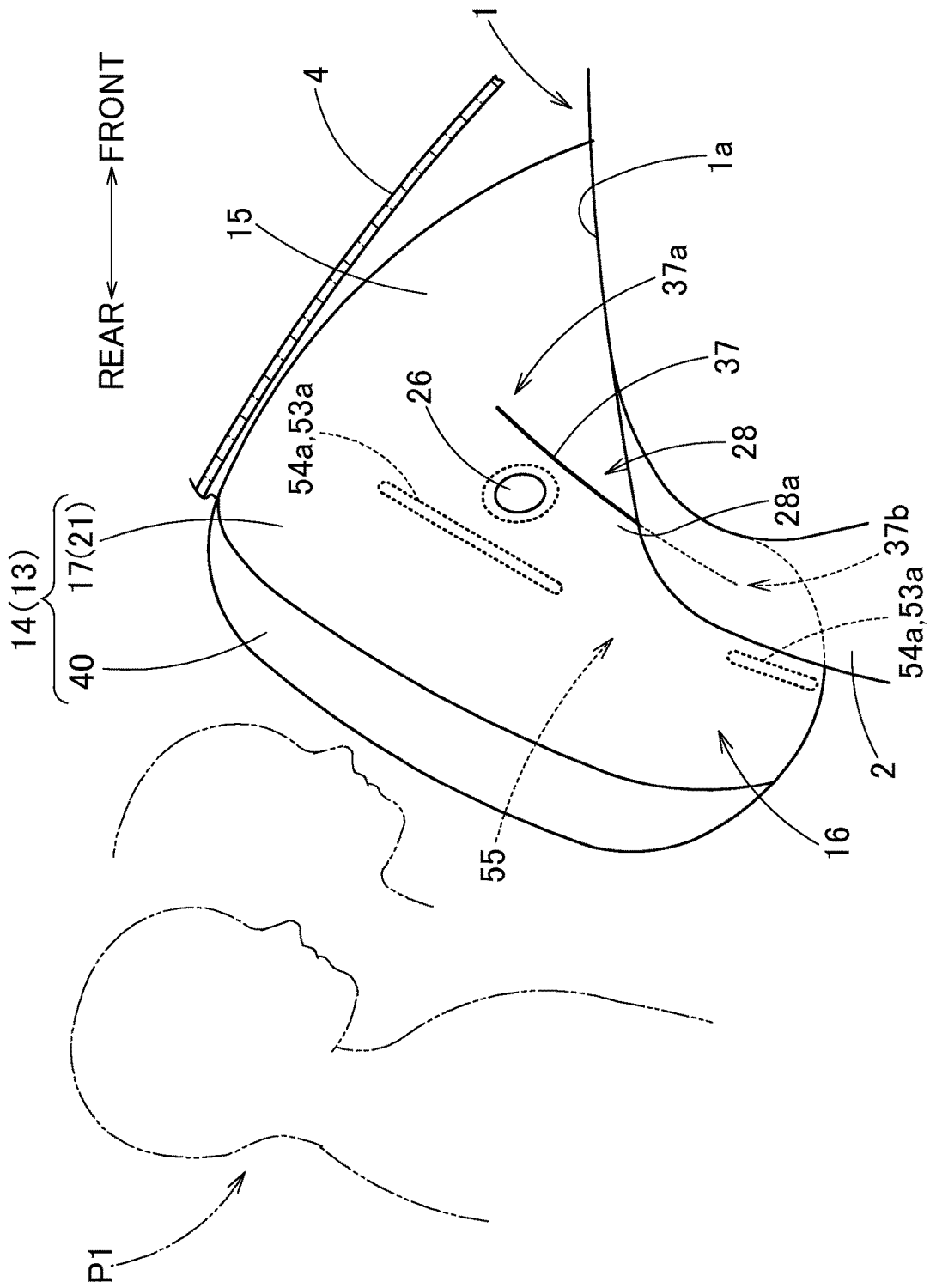
FIG. 3 is a schematic side view of the airbag for a passenger seat of the exemplary embodiment as deployed, viewed from the center in a vehicle-width direction of the vehicle.
Figure 4:
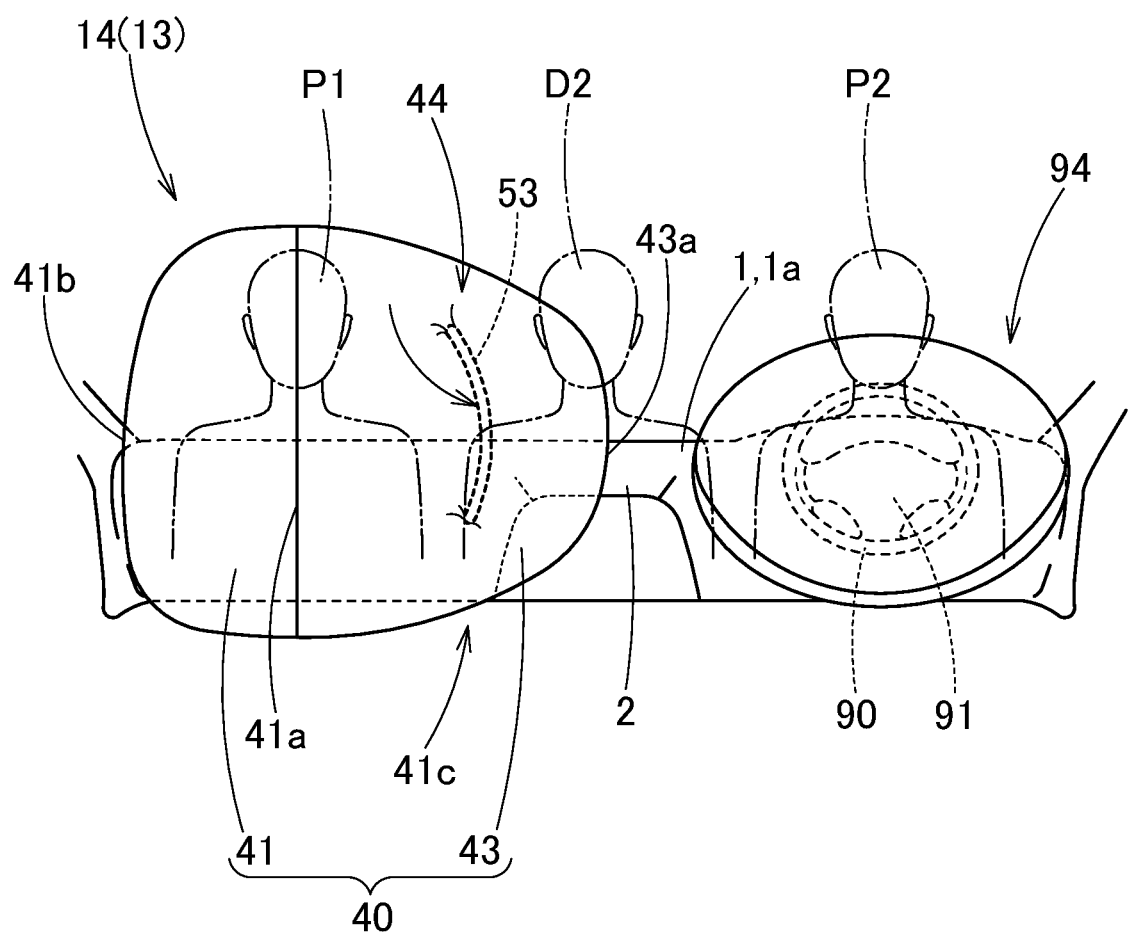
FIG. 4 is a schematic front elevation of the airbag for a passenger seat of the exemplary embodiment as deployed, viewed from a rear side of the vehicle.
Figure 5:
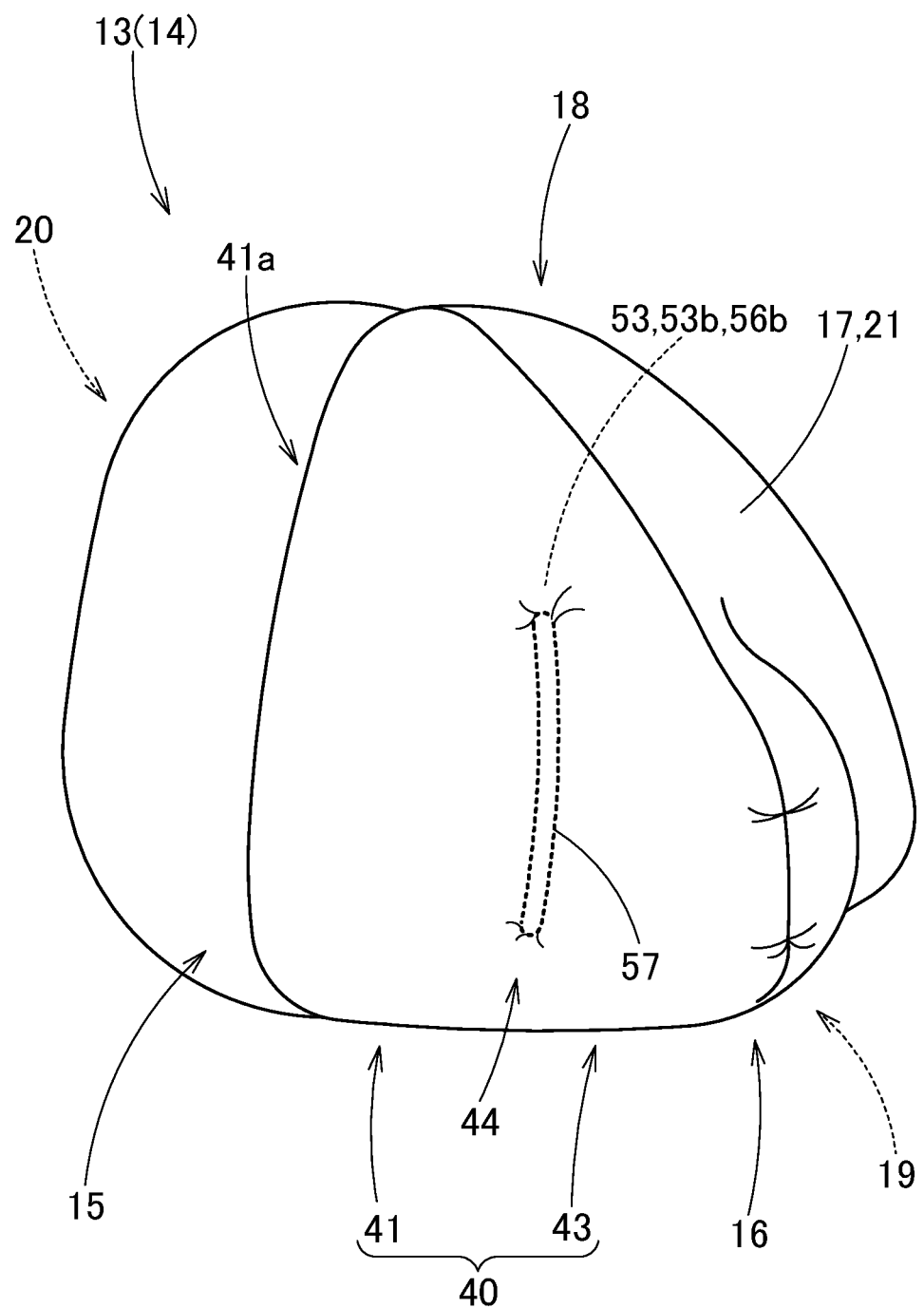
FIG. 5 is a schematic perspective view of the airbag of the exemplary embodiment as inflated by itself, as viewed from a rear side.

The bag body 14 is formed of a sheet-shaped material having flexibility, and designed to inflate in such a manner as to fill a space between the top plane 1a of the dashboard 1 and the windshield 4 in front of the passenger seat PS, as shown in FIGS. 1 and 2 by double-dotted liens and shown in FIGS. 3 and 4. More specifically, the bag body 14 is designed to inflate generally into a square pyramid whose top is located at the front end of the bag body 14. The bag body 14 includes a passenger-side wall 40 which is disposed at the rear portion of the bag body 14 as deployed for catching passengers (i.e. a passenger P1 and a center passenger P2), and a vehicle-side wall 17 which extends towards the front end of the bag body 14 as deployed from an outer circumferential edge of the passenger-side wall 40 in a narrowing fashion and is mounted on the case 12 by its front end portion 17a. The passenger-side wall 40 of the bag body 14 as deployed is configured such that the right area (i.e. the area disposed towards the center of the vehicle-width direction) with respect to a center line CL, which runs through the center of the case 12 generally along the front and rear direction, expands more in a direction drawing away from the center line CL than the left area with respect to the center line CL. Thus the passenger-side wall is bilaterally asymmetrical in shape with respect to the center line CL. The area of the passenger-side wall 40 expanding considerably toward the right defines a center protection region 43. That is, the passenger-side wall 40 includes a passenger protection region 41 for arresting the passenger P1 sitting in the normal passenger seat PS which is located on an opposite side to the driver's seat DS in the vehicle-width direction and the center protection region 43 which expands towards the center of the vehicle-width direction from the passenger protection region 41 for arresting the center passenger P2. In terms of inflatable portions, the bag body 14 as inflated includes a main inflated portion 15 which has the passenger protection region 41 at the rear end, and a protruding inflated portion 16 which protrudes towards the center of the vehicle-width direction from the rear portion of the main inflated portion 15 and has the center protection region 43 at the rear end.

Referring to FIGS. 2, 3 and 5 to 8, the vehicle-side wall 17 is a portion configured to be deployed in such a manner as to fill the space between the top plane 1a of the dashboard 1 and the windshield 4 at airbag deployment. The vehicle-side wall 17 includes an upper side wall 18 and a lower side wall 19 which are opposed to one another in the up and down direction, and a left side wall 20 and a right side wall 21 which are opposed to one another in the left and right direction. A generally round gas inlet port 23 is formed for receiving the body portion 8a of the inflator 8 and introducing an inflation gas, proximate the front end of the lower side wall 19, which location being proximate to the front end 17a of the bag body 14 as deployed. A plurality of (four, in the illustrated embodiment) mounting holes 24 are formed in the peripheral portion of the gas inlet port 23 in the lower side wall 19 for receiving the bolts 9a of the retainer 9 so that the peripheral portion is mounted on the bottom wall 12a of the case 12. The gas inlet port 23 is located generally at the center in the left and right direction of the front end portion of the lower side wall 19. The airbag 13 is mounted on the case 12 such that the center C (FIGS. 1 and 7) of the gas inlet port 23 generally falls on the center in the left and right direction of the case 12. Further, each of the left side wall 20 and right side wall 21 of the vehicle-side wall 17 is provided with a generally round vent hole 26 for releasing an extra inflation gas, as can be seen in FIGS. 2 and 3.

The vehicle-side wall 17 further includes, in the right side (in the side facing towards the center in the vehicle-width direction), in other words, in the front side of the protruding inflated portion 16, a circumventing recess (as a recessed area) 28 which prevents the bag body 14 from being brought into engagement with the center panel (i.e. adjoining object) 2 of the dashboard 1. The circumventing recess 28 is formed in such a manner that the right side wall 21 is dent generally along the up and down direction of the bag body 14. In the illustrated embodiment, the circumventing recess 28 is disposed between a front surface 16a of the protruding inflated portion 16 and a right side 15a of the main inflated portion 15 of the bag body 14.

Figure 10:
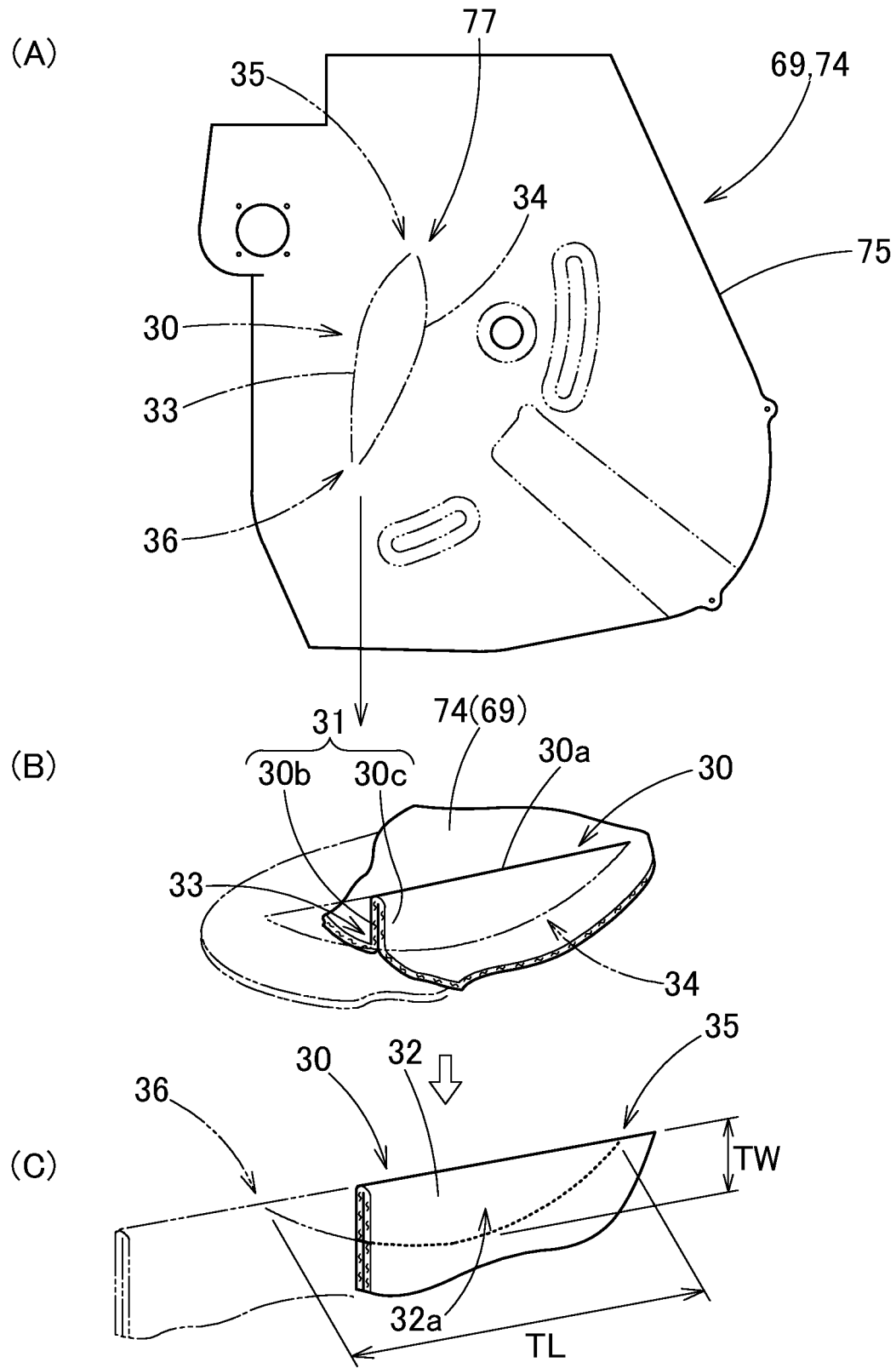
FIG. 10 illustrates a process of forming a tuck in the airbag of the exemplary embodiment.

The circumventing recess 28 is made by forming a tuck 30 that shortens a substantial length in the front and rear direction of the right side wall 21 of the vehicle-side wall 17, in a later-described right front panel 74, which is one of the base members 69 of the bag body 14, as shown in FIGS. 7, 8 and 10. Among the base members (bag-forming panels) 69 of the bag body 14, the right front panel 74 forms a generally right half region of the vehicle-side wall 17, as described later.

Referring to (A), (B) and (C) of FIG. 10, the tuck 30 is formed as follows: a predetermined portion 77 of the right front panel 74 is folded on a mountain fold 30a so as to form a doubled portion 31 in which panel materials 30b and 30c extending from the fold 30a form a double wall, and tuck jointing portions 33 and 34, each of which is disposed distant from the fold 30a and has a curved shape, are sewn together to form a seam. The tuck jointing portions 33, 34 have mutually intersecting portions 35 and 36 at opposite ends. The doubled portion 31 forms a seam allowance 32 of the tuck 30, and is disposed on an inner surface 14a of the bag body 14, in the illustrated embodiment.

The tuck 30 is formed in a tuck-forming area 77 which is distant from the outer circumferential edge 75 of the right front panel 74 as laid flat, more particularly, between the gas inlet port 23 and vent hole 26. The seam allowance 32 includes a widest portion 32a in a vicinity of the halfway point between the intersecting portions 35 and 36. Since the tuck 30 is formed in the area 77 distant from the outer circumferential edge 75 of the right front panel 74, although the tuck 30 reduces a substantial length of the right front panel 74 in a direction perpendicular to the fold 30a, it hardly affects the length of the outer circumferential length 75 itself or other regions to be joined to other panels.

Figure 6:
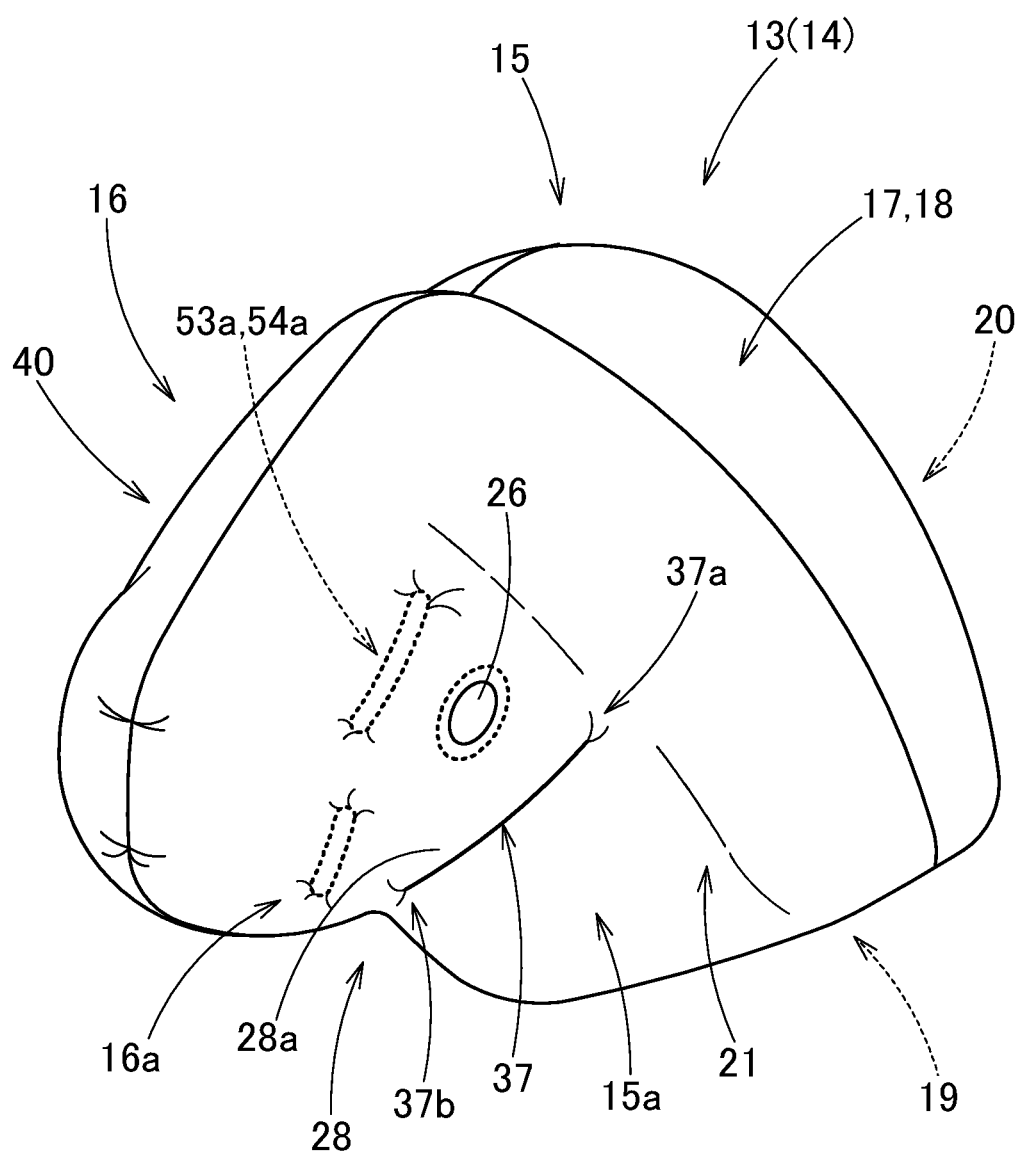
FIG. 6 is a schematic perspective view of the airbag of the exemplary embodiment as inflated by itself, as viewed from a front side.

A width TW and a length TL (see (C) of FIG. 10) of the tuck 30 have only to be such as to form the circumventing recess 28 which would prevent the bag body 14 from being brought into engagement with the center panel 2, in the vehicle-side wall 17 of the bag body 14. In the illustrated embodiment, the width TW is approximately 50 mm, and the length TL is approximately 350 mm. In other words, a dimension between most separated portions of the tuck jointing portions 33 and 34 (i.e. a width of the widest portion 32a) is approximately 100 mm, which is two times of the width TW, and a distance between the intersecting portions 35 and 36 is approximately 350 mm which is identical with the length TL. In the illustrated embodiment, since the seam allowance 32 is disposed on the inner surface 14a of the bag body 14, the tuck 30 forms a recessed line or groove 37 on the outer surface 14b, as shown in FIGS. 3 and 6. The tuck 30 of the illustrated embodiment is formed such that a lower end 37b of the recessed line 37 is located farther rearward and downward than an upper end 37a as can be seen in FIGS. 3 and 6, so that the circumventing recess 28 is shaped to the center panel 2 which protrudes rearward while enlarging downward.

The passenger-side wall 40 is generally rectangular in shape and has such a width as to extend towards the center in the vehicle-width direction. As described above, the passenger-side wall 40 of the illustrated embodiment includes the passenger protection region 41 which is a region disposed at the rear of the gas inlet port 23 for arresting the passenger P1 and the center protection region 43 which is disposed on the right side of the passenger protection region 41 for arresting the center passenger P2.

Figure 9:
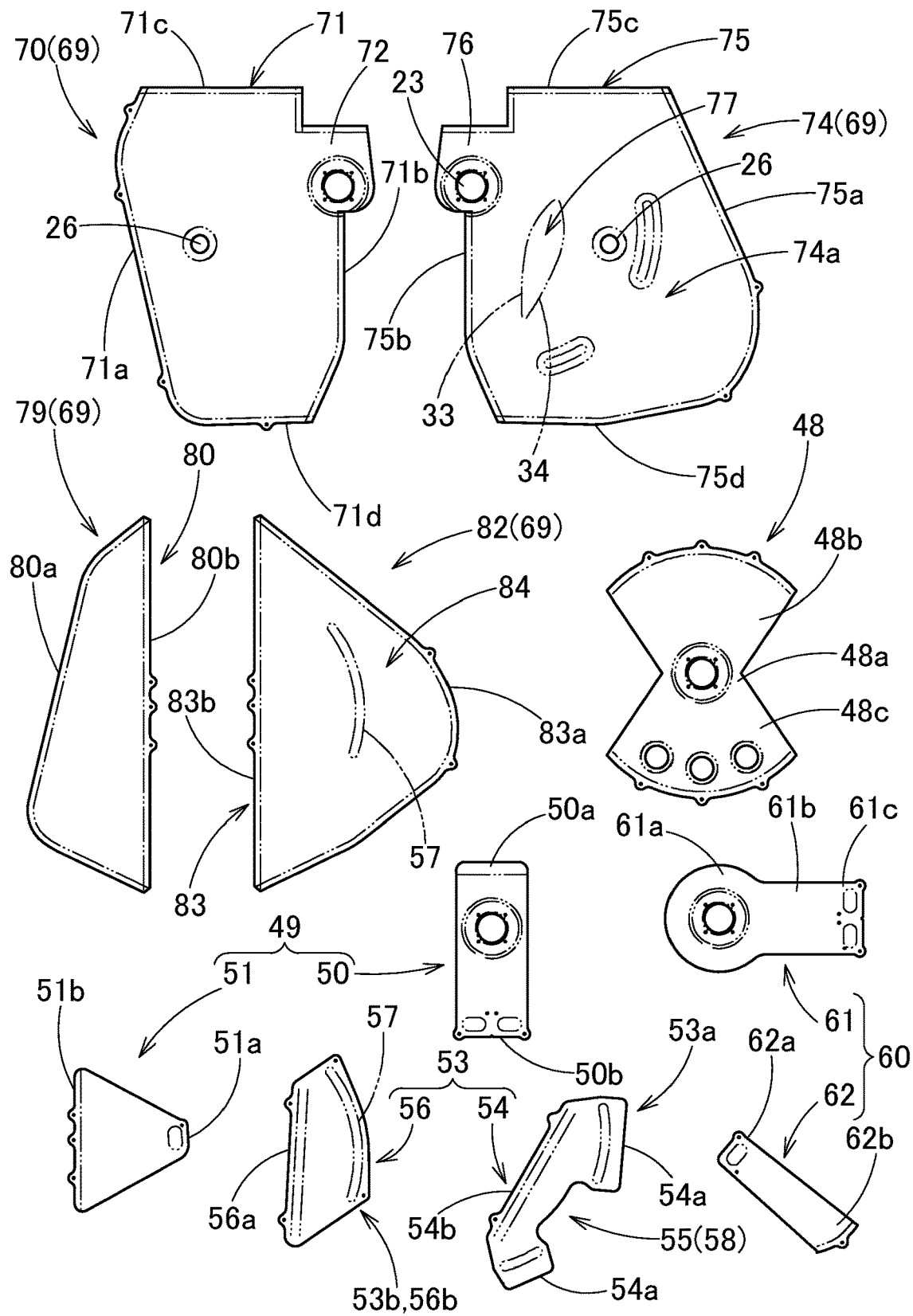
FIG. 9 depicts base members of the airbag of the exemplary embodiment in plan.

Referring to FIGS. 7 and 8, the redirecting cloth 45 located inside the bag body 14 is disposed over the gas inlet port 23 for redirecting an inflation gas G having flown into the bag body 14 via the inlet port 23 towards the left, right and rear. In the illustrated embodiment, the redirecting cloth 45 is formed generally into a tube having openings 45a at the left and right ends, and includes a plurality of (three, in the illustrated embodiment) round gas outlet ports 47a in a rear region of the tubular shape (i.e. in the rear region 47). The redirecting cloth 45 is composed of a base member 48 shaped like a constricted drum as can be seen in FIG. 9, and a central portion in the front and rear direction of the base member 48 serves as a joint region 48a which is joined to the peripheral portion of the gas inlet port 23 and is provided with openings (reference numerals omitted) corresponding to the gas inlet port 23 and mounting holes 24. The joint region 48a is sewn to the peripheral portion of the gas inlet port 23 by the entire circumference, and edges of band regions 48b, 48c which extend towards the front and rear from the joint region 48a are sewn together, thus providing the redirecting cloth 45 which has a tubular shape and includes the openings 45a at the left and right ends.

As described above, in the illustrated embodiment, the bag body 14 internally includes a front-rear tether 49, a regulating tether 53, and a bag-edge tether 60, as shown in FIGS. 7 and 8.

The front-rear tether 49 connects a vicinity of the gas inlet port 23 and the passenger-side wall 40 inside the bag body 14, and is configured to be deployed generally along the front and rear direction. The front-rear tether 49 is formed by jointing a front section 50 extending from the periphery of the gas inlet port 23 and a rear section 51 extending from the passenger-side wall 40. A rear end region 50b of the front section 50, which has a band shape, is doubled up in the left and right direction. At airbag deployment, the front section 50 is formed into such a three-dimensional, bilaterally symmetric shape approximate to a generally triangular pyramid that the front end region 50a extends generally along the left and right direction and the rear end region 50b extends generally along the up and down direction. The front end region 50a of the front section 50 is provided with openings (reference numerals omitted) corresponding to the gas inlet port 23 and mounting holes 24, and is sewn to an entire circumference of the gas inlet port 23. The rear section 51 has such a trapezoidal shape that narrows towards the front end 51a which is joined to the front section 50. In the illustrated embodiment, the rear end 51b of the rear section 51 is sewn to inner edges 80b and 83b of later-described left rear panel 79 and right rear panel 82 when the inner edges 80b and 83b are sewn together, so that the rear section 51 is connected to a generally central position in the up and down direction of the passenger protection region 41 of the passenger-side wall 40. That is, the rear end 51b of the rear section 51 is connected to a vicinity of an intersection of the passenger-side wall 40 and the center line CL (FIG. 1), i.e. to a generally central portion 41a in the left and right direction of the passenger protection region 41. The front-rear tether 49 is deployable generally along the center line CL, i.e. along the front and rear direction, at airbag deployment. The front-rear tether 49 prevents the passenger-side wall 40 from protruding rearward excessively, and limits a clearance between the gas inlet port 23 (or the case 12) and the central portion in the left and right direction of the passenger-protection region 41 of the passenger-side wall 40 at airbag deployment.

The regulating tether 53 is provided to pull the passenger-side wall 40 forward in order to shape the center protection region 43 and the passenger protection region 41 of the passenger-side wall 40 together into a generally flat plane at airbag deployment, and to make the left edge 41b region and right edge 41c region (which corresponds to a boundary 44 between the passenger protection region 41 and center protection region 43) of the passenger protection region 41 secure a symmetrical flatness in the left and right direction with respect to the center 41a (FIG. 7) at airbag deployment. To this end, a rear end 53b of the regulating tether 53 is joined to the right edge 41c of the passenger protection region 41 which is generally bilaterally symmetrical to the left edge 41b in position with respect to the center 41a, thus a joint 57 is formed. As shown in FIG. 4, the joint 57 of the regulating tether 53 to the passenger-side wall 40 is formed into a curved shape which is generally bilaterally symmetrical to the left edge 41b of the passenger protection region 41, more particularly, into such a shape that a central portion in the up and down direction protrudes towards the right. In the illustrated embodiment, a front end 53a of the regulating tether 53 is joined to a vicinity of a bottom 28a of the circumventing recess 28 in the right side wall 21 of the vehicle-side wall 17. Thus the regulating tether 53 shapes the passenger protection region 41 and the center protection region 43 together into a generally flat plane extending in the left and right direction. The regulating tether 53 also limits the thickness in the front and rear direction of the protruding inflated portion 16 as well as steadies a recessed shape of the vicinity of the bottom 28a of the circumventing recess 28.

In the illustrated embodiment, the regulating tether 53 is composed of a front section 54 and a rear section 56. A front edge 54a of the front section 54 is joined to the vicinity of the bottom 28a of the circumventing recess 28 in the right side wall 21 of the vehicle-side wall 17, and a rear edge 56b of the rear section 56 is joined to the passenger-side wall 40 in a curved shape. A rear edge 54b of the front section 54 and a front edge 56a of the rear section 56 are joined together. Moreover, as can be seen in FIG. 9, the front section 54 includes, in the front edge 54a to be joined to the right side wall 21, a recessed region 55 which the later-described bag-edge tether 60 can pass through. That is, in the illustrated embodiment, the recessed region 55 constitutes a through opening 58 which allows passage of the bag-edge tether 60 and prevent an engagement between the regulating tether 53 and bag-edge tether 60.

The bag-edge tether 60 connects a vehicle-center-side edge of the passenger-side wall 40 (i.e. the right edge of the passenger-side wall 40, in the illustrated embodiment) and a front end portion of the bag body 14 as inflated, inside the bag body 14. In the illustrated embodiment, specifically, the bag-edge tether 60 connects the right edge 43a of the center protection region 43 in the passenger-side wall 40 and the peripheral portion of the gas inlet port 23. The bag-edge tether 60 is formed by joining together a front section 61 extending from the peripheral portion of the gas inlet port 23 and a rear section 62 extending from the right edge 43a of the center protection region 43. The front section 61 includes a joint region 61a which is joined to the peripheral portion of the gas inlet port 23 and a main body 61b which extends towards the right from the joint region 61a. The joint region 61a is provided with openings (reference numerals omitted) corresponding to the gas inlet port 23 and mounting holes 24, and is sewn to the entire circumference of the gas inlet port 23. The main body 61b is formed generally into a band shape. A rear portion of the main body 61b is doubled up and joined to a front end 62a of the rear section 62. The rear section 62 is composed of a sheet material having a band-shape. A rear end 62b of the rear section 62 is joined to a region positioned rightmost and at the center in the up and down direction in the right edge 43a of the center protection region 43, and the front end 62a is joined to a leading end 61c of the main body 61b of the front section 61. In the illustrated embodiment, the rear end 62b of the rear section 62 is joined to the right edge 43a of the center protection portion 43 by being sewn together with an outer edge 83a of the right rear panel 82 and a rear edge 75d of the right front panel 74 when the panels 82, 74 are sewn together. As described above, the bag-edge tether 60 passes through the through opening 58 (or recessed region 55) of the regulating tether 53, thus is disposed in such a manner as to penetrate the regulating tether 53. The bag-edge tether 60 suppresses an oscillation in the vehicle width direction of the bag body 14 as deployed, and prevents a right edge portion of the passenger-side wall 40 (i.e. the right edge 43a portion of the center protection region 43) as deployed from protruding rearward too much. The bag-edge tether 60 is deployed in a tense condition through the through opening 58 at deployment of the bag body 14.

The bag body 14 is formed by sewing together circumferential edges of predetermined shaped bag-forming panels (i.e. base members) 69. In the illustrated embodiment, the bag forming-panels 69 includes a left front panel 70 and a right front panel 74, which form the vehicle-side wall 17, and a left rear panel 79 and a right rear panel 82, which form the passenger-side wall 40, as can be seen in FIG. 9.

The left front panel 70 and right front panel 74 constitute a left generally half area and a right generally half area of the vehicle-side wall 17, respectively. The left front panel 70 constitutes the left side wall 20, a left generally half area of the upper side wall 18, and a left generally half area of the lower side wall 19. The left front panel 70 is provided, in the front end region, with a protruding region 72 for forming the gas inlet port 23 and its peripheral portion. The right front panel 74 constitutes the right side wall 21, a right generally half area of the upper side wall 18, and a right generally half area of the lower side wall 19. The right front panel 74 is also provided, in the front end region, with a protruding region 76 for forming the gas inlet port 23 and its peripheral portion. The left front panel 70 and right front panel 74 are bilaterally symmetrical in shape except the rear edge regions. More specifically, the right front panel 74 includes a protrusion-forming portion 74a for forming the protruding inflated portion 16 by an upper edge 75a and a rear edge 75d of the outer circumferential edge 75, and a portion in a vicinity of the rear edge 75d of the right front panel 74 is formed to protrude rearward considerably so as to correspond to the right rear panel 82 in shape, as described later.

The left rear panel 79 and right rear panel 82 constitute a left area and a right area of the passenger-side wall 40, respectively. More particularly, the left rear panel 79 constitutes a generally left half area of the passenger protection region 41, and the right rear panel 82 constitutes a generally right half area of the passenger protection region 41 and the center protection region 43. The left rear panel 79 is formed into a generally trapezoidal shape, and the right rear panel 82 is formed into such a generally triangular shape that has a greater width in the left and right direction (or that protrudes more in the left and right direction) than the left rear panel 70. That is, the right rear panel 82 includes an extended area 84 for forming the protruding inflated portion 16 by an outer edge 83a of the outer circumferential edge 83. The outer edges 80a, 83a of the outer circumferential edges 80, 83 of the left rear panel 79 and right rear panel 82 are generally shaped to the rear edges 71d, 75d of the outer circumferential edges 71, 75 of the left front panel 70 and right front panel 74, respectively.

In the airbag 13 of the illustrated embodiment, the bag-forming panels 69 for forming the bag body 14, i.e. the left front panel 70, right front panel 74, left rear panel 79 and right rear panel 82, the front section 50 and rear section 51 for forming the front-rear tether 49, the front section 54 and rear section 56 for forming the regulating tether 53, the front section 61 and rear section 64 for forming the bag-edge tether 60, and the base member 48 of the redirecting cloth 45, are formed of a flexible woven fabric of polyester yarn, polyamide yarn or the like.

Manufacturing of the airbag 13 is now described. In advance, the left rear panel 79 and right rear panel 82 are laid one over the other such that the inner edges 80b, 83b of the outer circumferential edges 80, 83 mate each other, and the inner edges 80b, 83b are sewn together with sewing threads. At this time, the rear end 51b of the rear section 51 of the front-rear tether 49 is also sewn together with the inner edges 80b, 83b.

Then the tuck 30 is formed according to the process depicted in (A), (B) and (c) of FIG. 10. The tuck-forming area 77 of the right front panel 74 is folded on the fold 30a so as to form the doubled portion 31 in which the panel materials 30b and 30c form a double wall, then the tuck jointing portions 33 and 34, which are distant from one another in the right front panel 74 as laid flat, are sewn together by a planar sewing with sewing threads. Thus the tuck 30 is formed in the right front panel 74.

The front edge 54a of the front section 54 of the regulating tether 53 is joined to the right front panel 74, and the rear edge 56b of the rear section 56 of the regulating tether 53 is joined to the right rear panel 82.

In the meantime, lower edges 71b, 75b of the outer circumferential edges 71, 75 of the left front panel 70 and right front panel 74 are mated and sewn together with sewing threads. Then the left front panel 70 and right front panel 74 are opened such that the protruding regions 72, 76 overlap one another. Subsequently, the front end 50a region of the front section 50 of the front-rear tether 49, the joint region 61a of the front section 61 of the bag-edge tether 60, and the joint region 48a of the base member 48 of the redirecting cloth 45 are laid on the protruding regions 72, 76 and sewn to the protruding regions 72, 76 by the peripheral portion of the gas inlet port 23 with sewing threads. Then the gas inlet port 23 and mounting holes 24 are punched out. Then the upper edges 71a, 75a of the outer circumferential edges 71, 75 of the left front panel 70 and right front panel 74 are sewn together with sewing threads.

Thereafter, the left front panel 70 and right front panel 74 are opened such that the rear edges 71d, 75d of the outer circumferential edges 71, 75 are separated from one another, then the left rear panel 79 and right rear panel 82, which has been opened such that the outer edges 80a, 83a are separated from each other, is laid thereon. Then the rear edge 71d of the left front panel and the outer edge 80a of the left rear panel 80 are sewn together with sewing threads while the rear edge 75d of the right front panel 74 and outer edge 83a of the right front panel 82 are sewn together with sewing threads. The rear end 62b of the rear section 62 of the bag-edge tether 60 is sewn together with the rear edge 75d of the right front panel 74 and outer edge 83a of the right front panel 82. Thereafter, the redirecting cloth 45 is formed by sewing together outer circumferential edges of the band regions 48b, 48c of the base member 48. The regulating tether 53 is formed by sewing together the rear edge 54b of the front section 54 and front edge 56a of the rear section 56. Likewise, the front-rear tether 49 is formed by sewing together the rear end 50b of the front section 50 and front end 51a of the rear section 51, and the bag-edge tether 60 is formed by sewing together the leading end 61c of the main body 61b of the front section 61 and front end 62a of the rear section 62. Thereafter, the bag body 14 is turned inside out via an unsewn region of the front edges 71c, 75c of the left front panel 70 and right front panel 74 so that seam allowances may not be exposed outside. If then the front edges 71c, 75c of the left front panel 70 and right front panel 74 are sewn together, the airbag 13 is finished.

The airbag 13 formed as described above is folded up for storage in the case 12, and the airbag 13 as folded up is wrapped by a not-shown breakable wrapping sheet for keeping the folded-up configuration. Before the airbag 13 is folded, the retainer 9 was disposed on the peripheral portion of the gas inlet port 23 inside the airbag 13 such that the bolts 9a protrude out. Then the airbag 13 is placed on the bottom wall 12a of the case 12, and the main body 8a of the inflator 8 is set in the case 12 from the lower side of the bottom wall 12a such that the bolts 9a of the retainer 9 projecting downwardly out of the bottom wall 12a go through the flange 8c of the inflator 8. If then the bolts 9a projecting out of the flange 8c of the inflator 8 are fastened with nuts 10, the airbag 13 and the inflator 8 are mounted on the case 12.

Thereafter, the circumferential wall 12b of the case 12 is coupled to the joint wall 6c of the airbag cover 6 which has been mounted on the dashboard 1 of the vehicle V, and the not-shown brackets of the case 12 are secured to the vehicle body structure. Thus the airbag device M for a passenger seat is mounted on the vehicle V.

As shown in FIGS. 1 and 4, the steering wheel 90 of the vehicle V, which is disposed in front of the driver's seat DS on the right of the center seat CS, is equipped with an airbag device 93 for a steering wheel. The airbag device 93 includes an airbag 94 for a steering wheel, which is stored in a boss section 91 of the steering wheel 90 in a folded-up configuration, and an inflator (not shown) for feeding the airbag 94 with an inflation gas. The airbag 94 is composed of a sheet material having flexibility, and configured to be deployed over a top plane (or rear plane) of the steering wheel 90 when fed with an inflation gas. Similarly to the inflator 8 of the airbag device M for a passenger seat, the inflator of the airbag device 93 for a steering wheel is configured to be actuated in the event of a frontal collision of the vehicle V.

After the airbag device M for a passenger seat was mounted on the vehicle V, in the event of a frontal collision of the vehicle V, the inflator 8 discharges an inflation gas G from the gas discharge ports 8b to inflate the airbag 13. Then the airbag 13 pushes and opens the doors 6a and 6b of the airbag cover 6 and protrudes upward out of the case 12 via an opening formed by opening of the doors 6a and 6b, and is deployed rearward in such a manner as to fill the space between the top plane 1a of the dashboard 1 and windshield 4, as shown in FIGS. 3 and 4. At the same time, the airbag 94 for a steering wheel is also fed with an inflation gas and deployed over the top plane (or rear plane) of the steering wheel 90.

Thus the airbag 13 as fully inflated protects the front seat passenger P1 and center passenger P2 which move forward, while the airbag 94 as fully inflated protects the driver D1 which moves forward. Although the vehicle V is provided with the center panel (i.e. adjoining object) 2 which protrudes rearward from the central portion in the vehicle-width direction of the dashboard 1 and adjoins the airbag 13 as deployed, the airbag 13 will be prevented from being interfered by the center panel 2 due to the presence of the circumventing recess (i.e. recessed area) 28, thus able to deploy the passenger-side wall 40 in a flat, uninclined plane spread in the left and right direction, and arrest the passengers P1 and P2 adequately.

In the airbag 13 for a passenger seat of the illustrated embodiment, the circumventing recess (i.e. recessed area) 28 is composed of the tuck 30 that is formed by jointing the tuck jointing portions 33, 34 of the right front panel 74, the base member of the vehicle-side wall 17, according to the process shown in (A), (B) and (C) of FIG. 10. That is, the circumventing recess 28 is composed of the right front panel 74 itself, which contributes to reduction of the number of parts of the airbag 13. Unlike an instance where a circumventing recess is formed by a tether that would have to be connected to two portions considerably distant from each other in a left and right direction, the circumventing recess 28 of the exemplary embodiment can be easily formed by jointing the panel materials 30b and 30c on both side of the fold 30a, i.e. jointing two portions in a single base member (i.e. right front panel 74) of the airbag 13. The tuck 30 formed in the right front panel 74 shortens the substantial length of the panel 74 in a direction generally perpendicular to the fold 30a which is formed to double the panel materials 30b and 30c. In other words, referring to the horizontal sectional view in FIG. 7, the tuck 30 makes two portions of the right front panel 74 each distant from the tuck 30 closer to each other with respect to the tuck 30, thus providing the recessed area 28 having the tuck 30 as the bottom 28a.

Therefore, the airbag 13 for a passenger seat in accordance with the exemplary embodiment has the recessed area 28 for circumventing an adjoining object, which is formed by a simple work of forming the tuck 30.

In the foregoing embodiment, the front end 53a of the regulating tether 53 is joined to the front portion 16a of the protruding inflated portion 16, thus makes the circumventing recess 28 even more recessed. However, as in a bag body 14A of an airbag 13A shown in FIG. 11, a tuck 30A alone, which has the same configuration as the tuck 30, is able to form a recessed area 28A with no regulating tether 53, so that the airbag 13A will be prevented from being interfered with the center panel (i.e. the adjoining object) 2. As indicated with double-dotted lines in FIG. 11, if the airbag 13A is not provided with the recessed area 28A composed of the tuck 30A, the airbag 13A will hit the center panel 2, the center protection region 43 of the passenger-side wall 40 will thus protrude rearward, so that the airbag 13A may fail to arrest the passengers P1 and P2 adequately.

Since the airbag 13 of the foregoing embodiment is provided with the regulating tether 53 that is joined to the front portion 16a of the protruding inflated portion 16 and contributes to deepen a vicinity of the bottom 28a of the recessed area 28, the airbag 13 will be further smoothly prevented from being interfered with the center panel (i.e. adjoining object) 2.

Figure 11:
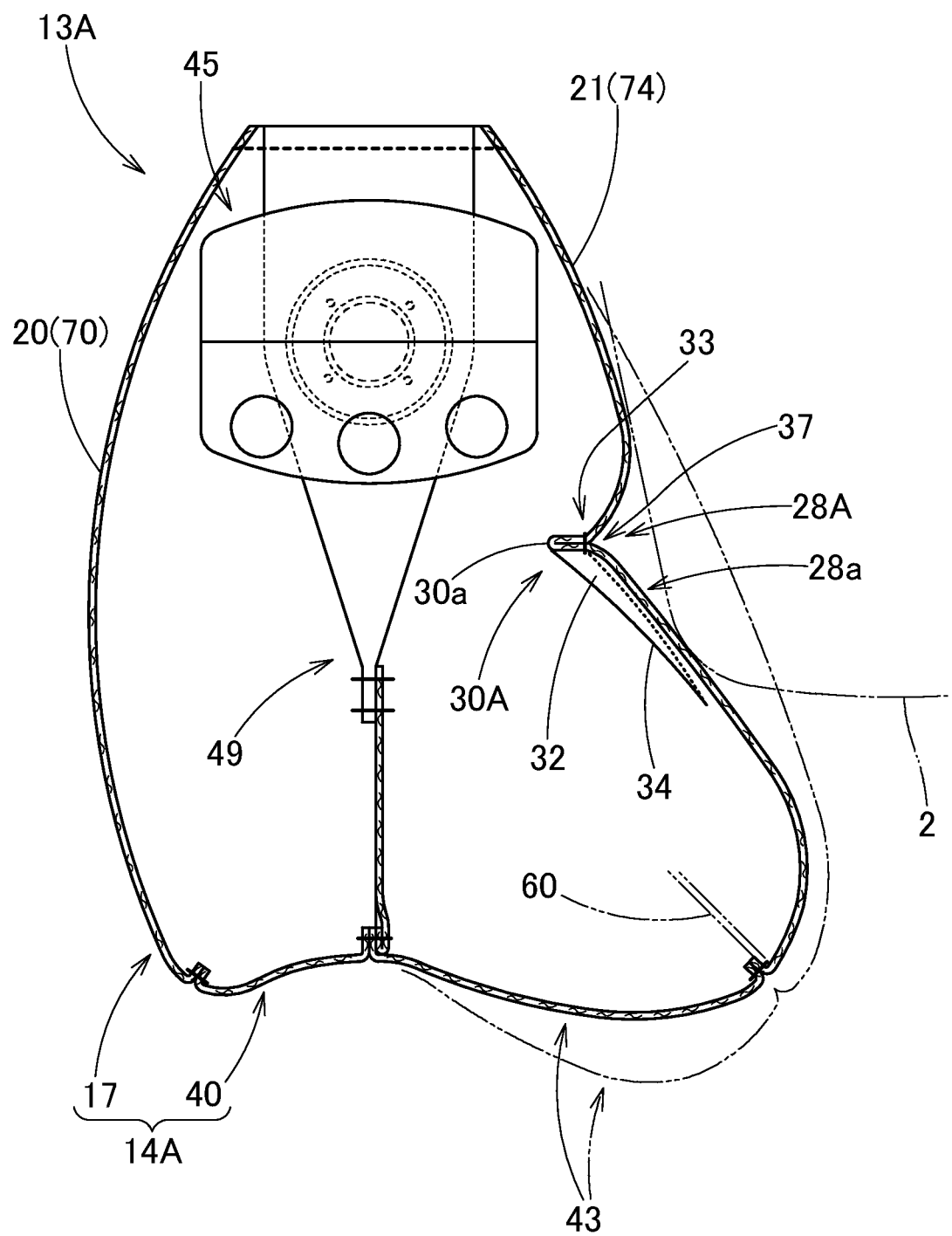
FIG. 11 is a schematic horizontal sectional view of an airbag in accordance with an alternative embodiment as inflated by itself.

Although the airbag 13A depicted in FIG. 11 is not provided with a bag-edge tether 60, it may include a bag-edge tether 60, as indicated with double-dotted lines.

In the bag body 14 of the airbag 13 of the exemplary embodiment, the tuck 30 is formed in the tuck-forming area 77 which is distant from the outer circumferential edge 75 of the right front panel 74 of the base members 69 of the airbag 13, as can be seen in FIG. 10.

With this configuration, when the bag body 14 of the airbag 13 is formed by joining outer circumferential edges of more than one base members 69, the outer circumferential edge 75 of the right front panel 74 having the tuck 30 can be smoothly joined with predetermined portions of the outer circumferential edges 71, 83 of other base members 69 such as the left front panel 70 and right rear panel 82, since the tuck 30 formed at a position distant from the outer circumferential edge 75 will hardly affect the length and/or shape of the outer circumferential edge 75 of the right front panel 74.

In the airbag 13 of the illustrated embodiment, the seam allowance 32 of the tuck 30, i.e. the portion between the tuck jointing portions 33 and 34, is disposed inside the bag body 14 of the airbag 13.

With this configuration, the seam allowance 32 of the tuck 30 will not be exposed on the outside of the airbag 13, thus will not be brought into engagement with any adjoining objects at airbag deployment.

If such an advantageous effect does not have to be considered, the seam allowance 32 of the tuck 30 may be disposed on the outer surface 14b of the airbag 13.

In the airbag 13 of the illustrated embodiment, moreover, the recessed area 28 is disposed in the right side wall 21 of the vehicle-side wall 17, i.e. in a part of the vehicle-side wall 17 to be deployed towards the center of the vehicle width, so as to circumvent the center panel (i.e. adjoining object) 2 disposed in the central area in the left and right direction of the instrument panel 1.

The airbag 13 thus configured will be deployed such that the center panel 2 is stored in the recessed area 28, so that the passenger-side wall 40 will be deployed into a flat plane spread in the left and right direction with no tilt in the front and rear direction, thus able to restrain the passengers P1 and P2 adequately.

In the illustrated embodiment, especially, the passenger-side wall 40 is configured such that its inboard-side area, which is deployable towards the center of the vehicle width with respect to the center line CL which runs through the center of the storage 12 in the front and rear direction and at the rear of the recessed area 28, is greater in area than an outboard-side area, which is deployable towards a side of the vehicle V with respect to the center line CL.

With this configuration, if the vehicle V has a center seat CS between the passenger seat PS and driver's seat DS, and a passenger (i.e. center passenger) P2 is sitting in the center seat CS, the passenger-side wall 40 extended towards the center in the left and right direction of the vehicle V will smoothly restrain and protect the center passenger P2.

In the foregoing description, the center panel 2 has been described as the adjoining object which the airbag 13 aims to circumvent with the circumventing recess 28 when deployed. However, the circumventing recess may be formed to circumvent other adjoining objects of the vehicle such as a monitor of a navigation system or the like.

What is claimed is:

1. An airbag for a passenger seat adapted to be folded and stored in a storage which is disposed in an instrument panel in front of a passenger seat of a vehicle, the airbag comprising:
    a passenger-side wall that is disposed in a rear portion of the airbag as deployed for arresting a passenger;
    a vehicle-side wall that extends from an outer circumferential edge of the passenger-side wall towards a front end portion of the airbag as deployed in a narrowing fashion, the vehicle-side wall being configured to be mounted on the storage by a front end portion thereof; and
    a recessed area that is formed in the vehicle-side wall for circumventing an adjoining object disposed in the vehicle when deployed,
    wherein the recessed area is composed of a tuck that is formed in a base member of the vehicle-side wall,
    wherein the tuck is formed by jointing one or more pair of tuck jointing portions that are distant from one another in the base member as laid flat,
    wherein the recessed area is disposed in a part of the vehicle-side wall to be deployed towards a center of width of the vehicle so as to circumvent an adjoining object disposed in a central area in a left and right direction of the instrument panel,
    wherein the passenger-side wall includes an outboard-side area that is deployable towards a side of the vehicle with respect to a center line which runs through a center of the storage in a front and rear direction, and an inboard-side area that is deployable towards the center of the vehicle width with respect to the center line and at a rear of the recessed area, and
    wherein the inboard-side area is greater in area than the outboard-side area,
    wherein:
    the passenger-side wall as deployed includes a passenger protection region for arresting the passenger sitting in the passenger seat and a center protection region for arresting a center passenger sitting in a center seat which is disposed between the passenger seat and a driver's seat; and
    the airbag as inflated further includes:
    a main inflated portion that has the passenger protection region at a rear end thereof;
    a protruding inflated portion that has the center protection region at a rear end thereof and is disposed at the rear of the recessed area; and
    a regulating tether that is joined to a boundary between the passenger protection region and the center protection region by a rear end thereof and joined to a bottom of the recessed area by a front end thereof, the bottom of the recessed area being disposed proximate to the main inflated portion, in order to shape the center protection region and the passenger protection region together into a generally flat plane at airbag deployment.

2. The airbag of claim 1, wherein the tuck is formed at a position distant from an outer circumferential edge of the base member of the vehicle-side wall.

3. The airbag of claim 1, wherein a seam allowance of the tuck is disposed inside the airbag.

4. The airbag of claim 1, wherein:
    the airbag as inflated further includes:
    a bag-edge tether that connects a side edge of the passenger-side wall on the part of the center protection region and the front end portion of the airbag in order to prevent the airbag from oscillating in a vehicle-width direction at airbag deployment.

5. An airbag for a passenger seat adapted to be folded and stored in a storage which is disposed in an instrument panel in front of a passenger seat of a vehicle, the airbag comprising:
    a passenger-side wall that is disposed in a rear portion of the airbag as deployed for arresting a passenger;
    a vehicle-side wall that extends from an outer circumferential edge of the passenger-side wall towards a front end portion of the airbag as deployed in a narrowing fashion, the vehicle-side wall being configured to be mounted on the storage by a front end portion thereof; and
    a recessed area that is formed in the vehicle-side wall for circumventing an adjoining object disposed in the vehicle when deployed,
    wherein the recessed area is composed of a tuck that is formed in a base member of the vehicle-side wall,
    wherein the tuck is formed by jointing one or more pair of tuck jointing portions that are distant from one another in the base member as laid flat,
    wherein the recessed area is disposed in a part of the vehicle-side wall to be deployed towards a center of width of the vehicle so as to circumvent an adjoining object disposed in a central area in a left and right direction of the instrument panel,
    wherein the passenger-side wall includes an outboard-side area that is deployable towards a side of the vehicle with respect to a center line which runs through a center of the storage in a front and rear direction, and an inboard-side area that is deployable towards the center of the vehicle width with respect to the center line and at a rear of the recessed area, and
    wherein the inboard-side area is greater in area than the outboard-side area, wherein:

the passenger-side wall as deployed includes a passenger protection region for arresting the passenger sitting in the passenger seat and a center protection region for arresting a center passenger sitting in a center seat which is disposed between the passenger seat and a driver's seat; and the airbag as inflated further includes:

a main inflated portion that has the passenger protection region at a rear end thereof;

a protruding inflated portion that has the center protection region at a rear end thereof and is disposed at the rear of the recessed area;

a regulating tether that is joined to a boundary between the passenger protection region and the center protection region by a rear end thereof and joined to a bottom of the recessed area by a front end thereof, the bottom of the recessed area being disposed proximate to the main inflated portion, in order to shape the center protection region and the passenger protection region together into a generally flat plane at airbag deployment; and a bag-edge tether that connects a side edge of the passenger-side wall on the part of the center protection region and a front end portion of the airbag in order to prevent the airbag from oscillating in a vehicle-width direction at airbag deployment, wherein the regulating tether includes a through opening that allows passage of the bag-edge tether.

6. The airbag of claim 5, wherein the tuck is formed at a position distant from an outer circumferential edge of the base member of the vehicle-side wall.

7. The airbag of claim 5, wherein a seam allowance of the tuck is disposed inside the airbag.

* * * * *